US012585274B2

(12) United States Patent
Suzuki et al.

(10) Patent No.: US 12,585,274 B2
(45) Date of Patent: Mar. 24, 2026

(54) AUTOMATIC TRAVELING METHOD, WORK VEHICLE, AND AUTOMATIC TRAVELING SYSTEM

(71) Applicant: Yanmar Holdings Co., Ltd., Osaka (JP)

(72) Inventors: Hidetaka Suzuki, Okayama (JP); Masaaki Murayama, Okayama (JP); Yuji Yamaguchi, Okayama (JP); Yasuto Nishii, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 158 days.

(21) Appl. No.: 17/985,940

(22) Filed: Nov. 14, 2022

(65) Prior Publication Data

US 2023/0176583 A1 Jun. 8, 2023

(30) Foreign Application Priority Data

Dec. 3, 2021 (JP) ................................. 2021-196961

(51) Int. Cl.
*G05D 1/00* (2024.01)
*A01D 41/127* (2006.01)

(52) U.S. Cl.
CPC ....... *G05D 1/0219* (2013.01); *A01D 41/1278* (2013.01)

(58) Field of Classification Search
CPC ............. G05D 1/0219; G05D 2107/21; G05D 2107/20; G05D 2107/23; G05D 2107/24;
(Continued)

(56) References Cited

U.S. PATENT DOCUMENTS 5,106,339 A * 4/1992 Braun ................ A01D 41/1277
460/7
6,122,572 A * 9/2000 Yavnai ................. G05D 1/0088
342/16
(Continued)

FOREIGN PATENT DOCUMENTS

JP 2020018236 A * 2/2020 ........... A01B 69/008
JP 2021083386 A 6/2021
(Continued)

OTHER PUBLICATIONS

Translation of WO-2019124174-A1 retrieved from Espacenet on Sep. 5, 2024 (Year: 2024).*
(Continued)

*Primary Examiner* — Fadey S. Jabr
*Assistant Examiner* — Faris Asim Shaikh
(74) *Attorney, Agent, or Firm* — Chris Mizumoto

(57) ABSTRACT

A combine harvester includes a control device and a portable terminal. The control device functions as an automatic traveling control part for controlling the combine harvester to perform automatic traveling on the basis of an automatic traveling route comprising a plurality of set straight traveling routes and a plurality of set turning routes, and as a discharge traveling control part for controlling the combine harvester to perform discharge traveling from a predetermined transition position on the automatic traveling route to a discharge position. The portable terminal includes the control device, and the control device functions as the transition position change part for changing, as the transition position, the first transition position that is set on the basis of the storage amount of harvested grain, to the new second transition position in response to the operation of the discharge transition operation part such as the discharge advance button and the discharge postpone button.

9 Claims, 7 Drawing Sheets

(58) Field of Classification Search

CPC ............ G05D 1/021; G05D 1/02; G05D 1/43; G05D 2109/10; A01D 41/1278; A01D 41/127; A01D 41/1277; A01D 41/02; A01D 41/1275; A01B 69/008; A01B 69/007; A01B 69/001; A01B 69/00; B60W 2300/12; B60W 2300/15; B60W 2300/152; B60W 2300/158; B60W 2300/154; B60W 2300/44; B60W 60/00256; B60W 60/001; B60W 60/00; B60W 2520/06

See application file for complete search history.

(56) References Cited

U.S. PATENT DOCUMENTS

| | | | | |
|---|---|---|---|---|
| 2007/0016366 | A1* | 1/2007 | Nagasawa | G05D 1/0223 |
| | | | | 701/413 |
| 2011/0089090 | A1* | 4/2011 | Nierle | G01N 21/359 |
| | | | | 209/587 |
| 2014/0121882 | A1* | 5/2014 | Gilmore | G05D 1/0295 |
| | | | | 701/25 |
| 2015/0070362 | A1* | 3/2015 | Hirai | G06T 13/80 |
| | | | | 345/475 |
| 2017/0188514 | A1* | 7/2017 | Ueda | A01D 67/00 |
| 2017/0316692 | A1* | 11/2017 | Rusciolelli | G08G 1/166 |
| 2017/0336787 | A1* | 11/2017 | Pichlmaier | A01B 69/008 |
| 2017/0357267 | A1* | 12/2017 | Foster | G01C 21/005 |
| 2019/0090472 | A1* | 3/2019 | Crinklaw | G05D 1/223 |
| 2020/0064144 | A1* | 2/2020 | Tomita | A01B 79/005 |
| 2020/0196526 | A1* | 6/2020 | Koch | G05D 1/0287 |
| 2020/0359547 | A1* | 11/2020 | Sakaguchi | B60W 60/005 |
| 2021/0053229 | A1* | 2/2021 | Yuan | G05D 1/0038 |
| 2021/0132608 | A1* | 5/2021 | Cavender-Bares | A01B 51/02 |
| 2021/0158041 | A1* | 5/2021 | Chowdhary | G06V 20/188 |
| 2021/0185942 | A1* | 6/2021 | Sibley | G06T 7/0012 |
| 2021/0302962 | A1* | 9/2021 | Sakaguchi | G01C 21/3826 |
| 2022/0026920 | A1* | 1/2022 | Ebrahimi Afrouzi | G06N 7/01 |
| 2022/0066456 | A1* | 3/2022 | Ebrahimi Afrouzi | |
| | | | | G06F 3/04883 |
| 2022/0301440 | A1* | 9/2022 | Reagan | G05D 1/633 |
| 2023/0027697 | A1* | 1/2023 | Rush | A01D 43/073 |
| 2023/0081284 | A1* | 3/2023 | Nishii | G05D 1/6484 |
| | | | | 701/25 |
| 2023/0176583 | A1 | 6/2023 | Suzuki et al. | |

FOREIGN PATENT DOCUMENTS

| | | | | |
|---|---|---|---|---|
| WO | WO-2017159801 | A1 * | 9/2017 | .......... A01B 69/008 |
| WO | WO-2019124174 | A1 * | 6/2019 | .......... A01B 69/00 |

OTHER PUBLICATIONS

Translation of JP-2020018236-A retrieved from Espacenet on Sep. 5, 2024 (Year: 2024).*

Translation of WO-2017159801-A1 retrieved from Espacenet on Sep. 5, 2024 (Year: 2024).*

* cited by examiner

FIG. 3

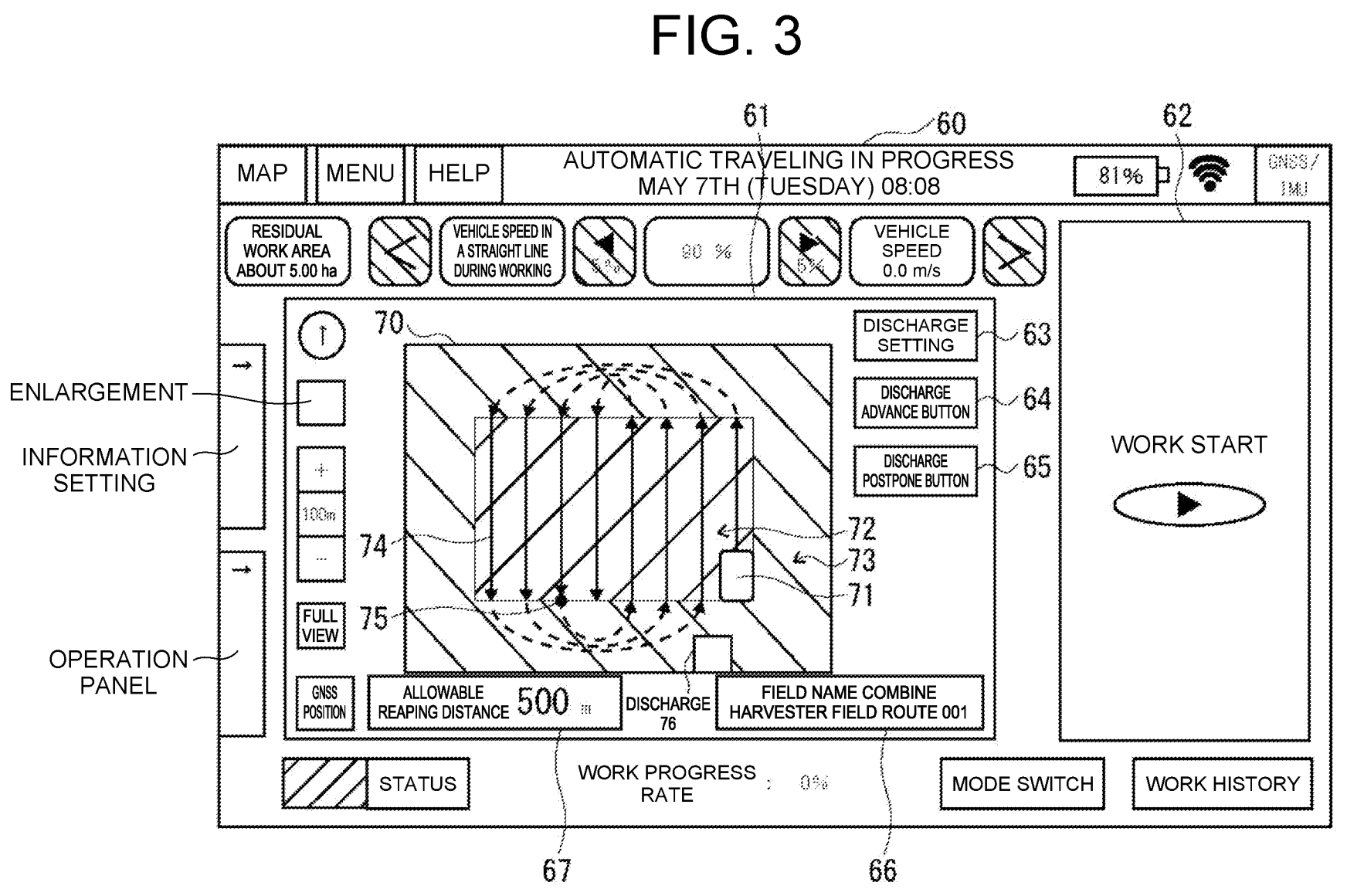

MAP | MENU | HELP

AUTOMATIC TRAVELING IN PROGRESS
MAY 7TH (TUESDAY) 08:08

60    61    62

81%    GNSS/
       IMU

WORK START

VEHICLE SPEED IN
A STRAIGHT LINE
DURING WORKING

80 %

VEHICLE
SPEED
0.0 m/s

DISCHARGE
SETTING    63

DISCHARGE
ADVANCE BUTTON    64

DISCHARGE
POSTPONE BUTTON    65

RESIDUAL
WORK AREA
ABOUT 5.00 ha

70

72
73
71

74    75

108m

FULL
VIEW

GNSS
POSITION

ALLOWABLE
REAPING DISTANCE
500 m

STATUS

DISCHARGE
76

FIELD NAME COMBINE
HARVESTER FIELD ROUTE 001

66

WORK PROGRESS
RATE    0%

67

WORK HISTORY

MODE SWITCH

ENLARGEMENT

INFORMATION
SETTING

OPERATION
PANEL

AUTOMATIC TRAVELING METHOD, WORK VEHICLE, AND AUTOMATIC TRAVELING SYSTEM

CROSS-REFERENCE

This application claims foreign priority of JP2021-196961, filed Dec. 3, 2021, the disclosure of which is hereby incorporated by reference in its entirety.

TECHNICAL FIELD

The present invention relates to an automatic traveling method, a work vehicle, and an automatic traveling system for causing a work vehicle to perform automatic traveling in a field.

BACKGROUND ART

Conventionally, a work vehicle such as a combine harvester, in a field, performs automatic reaping traveling in which the work vehicle performs reaping work while traveling automatically, stores harvested grain, performs discharge traveling, and moves to a discharge position to discharge the stored grain. Here, the work vehicle sets, on the basis of a timing when the storage amount of grain becomes full, a transition position for when the work vehicle interrupts the automatic reaping traveling and transitions to the discharge traveling.

For example, in the automatic traveling control system disclosed in Patent Document 1, a control part of a combine harvester includes a discharge control part, and the discharge control part sets a discharge timing of grain on the basis of an amount of grain stored in a grain tank detected by a storage amount sensor. Furthermore, in Patent Document 1, discharge traveling is executed in response to manual operation by the operator via operation buttons located in an operation part or via a management terminal.

In the traveling route calculation system disclosed in Patent Document 2, when a combine harvester is performing harvesting work in a field, a worker can view a grain storage amount displayed on a display of a communication terminal, and when the worker presses a grain discharge button, the combine harvester starts grain discharge work.

PRIOR ART DOCUMENT

Patent Document

Patent Document 1: Japanese Unexamined Patent Application Publication No. 2021-83386
Patent Document 2: Japanese Patent No. 6910285

SUMMARY OF INVENTION

Technical Problem

Conventionally, a combine harvester sets, on the basis of a storage amount of harvested grain, a transition position at which the automatic traveling is interrupted and the transition to discharge traveling is started. However, highly skilled workers are able to determine appropriate discharge timing for smooth reaping work regardless of the storage amount, and may desire to transition to the discharge traveling at a timing different from the transition position based on the storage amount. In the technologies described in Patent Document 1 and Patent Document 2, when the button is operated, the automatic traveling is interrupted to transition to the discharge traveling, so that the automatic traveling is interrupted in the middle of the work in rows. This causes a problem that the combine harvester is affected by the unworked rows and cannot travel smoothly when traveling to the discharge position or returning to the interruption position.

The purpose of the present invention is to provide an automatic traveling method, a work vehicle, and an automatic traveling system that can smoothly perform discharge traveling in accordance with worker's intention without interfering with smooth automatic traveling.

Solution to Problem

To solve the above problem, the automatic traveling method of the present invention is an automatic traveling method for causing a work vehicle to perform automatic traveling in a field, the method comprises an automatic traveling step for performing automatic traveling on the basis of an automatic traveling route comprising a plurality of set straight traveling routes and a plurality of set turning routes; a discharge traveling step for performing discharge traveling from a predetermined transition position on the automatic traveling route to a discharge position; and a transition position changing step for changing, as the transition position, a first transition position that is set on the basis of a storage amount of harvested grain, to a new second transition position in response to an operation of a discharge transition operation part.

In addition, to solve the above problem, the work vehicle of the present invention is a work vehicle that performs automatic traveling in a field, the work vehicle comprises an automatic traveling control part for controlling the work vehicle to perform automatic traveling on the basis of an automatic traveling route comprising a plurality of set straight traveling routes and a plurality of set turning routes; a discharge traveling control part for controlling the work vehicle to perform discharge traveling from a predetermined transition position on the automatic traveling route to a discharge position; and a transition position change part for changing, as the transition position, a first transition position that is set on the basis of a storage amount of harvested grain, to a new second transition position in response to an operation of a discharge transition operation part.

In addition, to solve the above problem, the automatic traveling system of the present invention is an automatic traveling system for causing a work vehicle to perform automatic traveling in a field, the system comprises an automatic traveling control part for controlling the work vehicle to perform automatic traveling on the basis of an automatic traveling route comprising a plurality of set straight traveling routes and a plurality of set turning routes; a discharge traveling control part for controlling the work vehicle to perform discharge traveling from a predetermined transition position on the automatic traveling route to a discharge position; and a transition position change part for changing, as the transition position, a first transition position that is set on the basis of a storage amount of harvested grain, to a new second transition position in response to an operation of a discharge transition operation part.

Advantageous Effects of Invention

The present invention provides an automatic traveling method, a work vehicle, and an automatic traveling system that can smoothly perform discharge traveling in accordance with worker's intention without interfering with smooth automatic traveling.

BRIEF DESCRIPTION OF DRAWINGS

FIG. 3 is a plan view illustrating an example of a work screen displayed on a portable terminal of the combine harvester according to the embodiment of the present invention;

DESCRIPTION OF EMBODIMENTS

Figure 1:
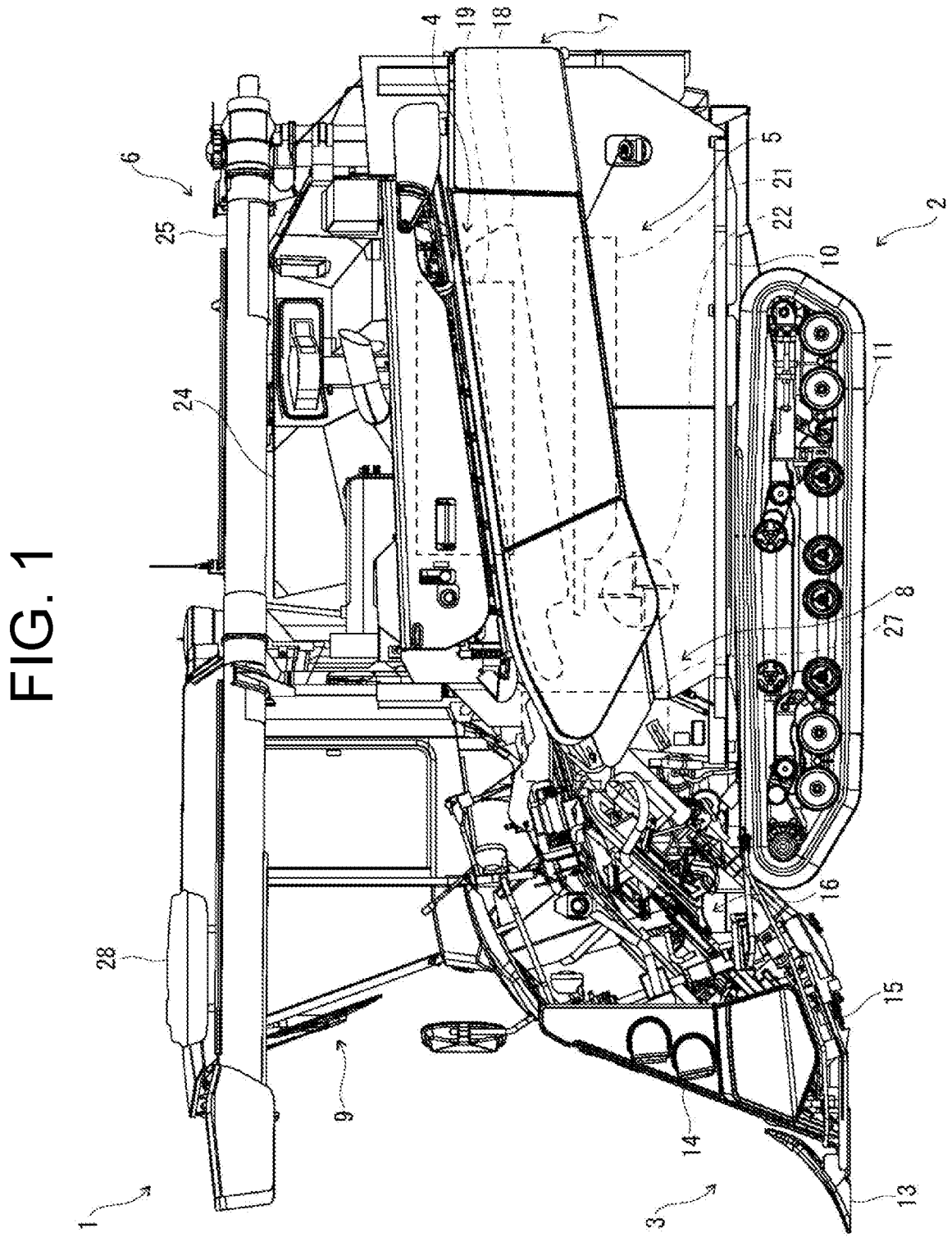
FIG. 1 is a side view of a combine harvester according to an embodiment of the present invention.

A combine harvester 1 according to an embodiment of the present invention will be described with reference to FIG. 1 and other drawings. The combine harvester 1 travels in a field as an object to be worked by automatic driving or manual operation, and performs work such as reaping for performing harvest work of crops from grain culms planted in the field. The combine harvester 1 is, for example, configured to perform automatic work in which steering is controlled by automatic driving while the traveling speed is controlled in response to manual operation, or unmanned work in which the steering and the traveling speed are controlled by automatic driving, and can travel, turn, and work autonomously in a field.

While traveling on straight rows, a predetermined number of which within the reaping possible row number is a reaping width, relative to a plurality of rows of grain culms, the combine harvester 1 performs reaping work for the straight rows. In the combine harvester 1, a traveling mode, either a manual traveling mode or an automatic traveling mode, is set. The combine harvester 1 is so configured as to perform, when being set to the manual traveling mode, the manual traveling according to steering of a steering part 9 by a worker.

On the other hand, the combine harvester 1 is configured to perform, when being set to the automatic traveling mode, automatic reaping traveling for performing reaping while traveling automatically in accordance with an automatic traveling route set in the field. For example, the combine harvester 1 performs the automatic reaping travel with a travel pattern such as reciprocating reaping in which the combine harvester 1 reciprocates between a plurality of straight routes in a region with unreaped grain culms in the field (hereinafter referred to as an "unreaped region"), or circumference reaping in which reaping is repeated by shifting the circumference of the straight route along an inner circumference of the unreaped region toward the center of the unreaped region.

Before the combine harvester 1 performs the automatic reaping traveling, the combine harvester 1 performs outer circumference reaping traveling, in which the combine harvester 1 travels circumferentially along the outer circumference of the field while reaping, so that a headland is formed in the field, and the inside of the headland is used as a work area for the automatic reaping traveling.

As the combine harvester 1 is storing the grains harvested from the field while the combine harvester 1 performs the reaping traveling, a collection part, such as a truck or a container, is provided outside the field to collect the grains harvested by the combine harvester 1. The combine harvester 1 sets a discharge position at which the grains are discharged from the combine harvester 1 to the collection part. The discharge position is located along the outer circumference of the field, and adjacent to the collection part. When the combine harvester 1 discharges the grains in the middle of the automatic reaping traveling, the combine harvester 1 interrupts the automatic reaping traveling at a predetermined transition position on the automatic traveling route and performs discharge traveling to move to the discharge position. The combine harvester 1, for example, sets an interruption position to interrupt the automatic reaping traveling, that is, a transition position to transition to the discharge traveling, on the basis of a timing when a storage amount of grain becomes full, but in this embodiment, the transition position is particularly changed in response to a predetermined operation.

As illustrated in FIG. 1, the combine harvester 1 includes a traveling part 2, a reaping part 3, a threshing part 4, a sorting part 5, a storage part 6, a discharged straw processing part 7, a power part 8, and a steering part 9, and is composed of a so-called head-feeding type combine harvester. The combine harvester 1 travels by the traveling part 2, threshes grain culms reaped by the reaping part 3 in the threshing part 4, sorts the grains in the sorting part 5, and stores the grains in the storage part 6. The combine harvester 1 causes the discharged straw processing part 7 to process threshed discharged straws. The combine harvester 1 drives the traveling part 2, the reaping part 3, the threshing part 4, the sorting part 5, the storage part 6, and the discharged straw processing part 7 with power supplied by the power part 8.

The traveling part 2 is provided below a main body frame 10, and includes a left-and-right pair of crawler type traveling devices 11, and a transmission (not illustrated). The traveling part 2 causes the combine harvester 1 to travel in the front-rear direction, or causes the combine harvester 1 to turn in the left-right direction by rotating crawlers of the crawler type traveling devices 11 with power (for example, rotational power) transmitted from an engine 27 of the power part 8. The transmission transmits the power (rotational power) of the power part 8 to the crawler type traveling devices 11, and is capable of shifting the rotational power.

The reaping part 3 is provided in front of the traveling part 2, and performs reaping work for the rows within the reaping possible row number.

The reaping part 3 includes a divider 13, a raising device 14, a cutting device 15, and a transport device 16. The divider 13 divides the grain culms in the field for each row, and guides, to the raising device 14, the grain culms for a predetermined number of rows within the reaping possible row number. The raising device 14 raises the grain culms guided by the divider 13. The cutting device 15 cuts the grain culms raised by the raising device 14.

The transport device 16 transports the grain culms cut by the cutting device 15 to the threshing part 4.

The threshing part 4 is provided behind the reaping part 3. The threshing part 4 includes a feed chain 18, and a threshing cylinder 19. The feed chain 18 transports the grain culms transported from the transport device 16 of the reaping part 3 in order to thresh, and further transports the threshed grain culms, that is, discharged straw to the discharged straw processing part 7. The threshing cylinder 19 threshes the grain culms transported by the feed chain 18.

The sorting part 5 is provided below the threshing part 4. The sorting part 5 includes a swing sorting device 21, a blower sorting device 22, a grain transport device (not illustrated), and a waste straw discharge device (not illustrated). The swing sorting device 21 sifts the threshed grains that fall from the threshing part 4 and sorts the threshed grains into grains, waste straw, and the like. The blower sorting device 22 further sorts the threshed grains sorted by the swing sorting device 21 into grains, waste straw, and the like by blowing air. The grain transport device transports the grains sorted by the swing sorting device 21 and the blower sorting device 22 to the storage part 6. The waste straw discharge device discharges the waste straw and the like sorted by the swing sorting device 21 and the blower sorting device 22 to the outside of the combine harvester.

The storage part 6 is provided on the right side of the threshing part 4. The storage part 6 includes a grain tank 24, and a discharge device 25. The grain tank 24 stores the grains transported from the sorting part 5. The maximum amount of grain that the grain tank 24 can store (maximum storage amount) is set in the storage part 6. The discharge device 25 is composed of an auger or the like, and discharges the grains stored in the grain tank 24 to any place. In addition, the storage part 6 includes a storage detection part 26 (sensor) that detects a storage amount of grain stored in the grain tank 24 (see FIG. 2).

The discharged straw processing part 7 is provided behind the threshing part 4. The discharged straw processing part 7 includes a discharged straw transport device (not illustrated), and a discharged straw cutting device (not illustrated). The discharged straw transport device transports the discharged straws transported from the feed chain 18 of the threshing part 4 to the discharged straw cutting device. The discharged straw cutting device cuts the discharged straws transported by the discharged straw transport device, and discharges the cut discharged straws to the outside of the combine harvester.

The power part 8 is provided above the traveling part 2 and in front of the storage part 6. The power part 8 includes the engine 27 that generates rotational power. The power part 8 transmits the rotational power generated by the engine 27 to the traveling part 2, the reaping part 3, the threshing part 4, the sorting part 5, the storage part 6, and the discharged straw processing part 7.

The steering part 9 is provided above the power part 8. The steering part 9 includes, around a driver's seat which is a seat on which a worker sits, as operation tools for steering the traveling of the combine harvester 1, a steering wheel for instructing turning of the machine body of the combine harvester 1, a main shift lever and a sub-shift lever for instructing change of the forward and backward traveling speed of the combine harvester 1. The manual traveling of the combine harvester 1 is executed by the traveling part 2 that receives the operation of the steering wheel of the steering part 9, the main shift lever, and the sub-shift lever.

The steering part 9 includes a mechanism for operating the reaping work by the reaping part 3, the threshing work by the threshing part 4, the discharge work by the discharge device 25 of the storage part 6, and other work.

The combine harvester 1 includes a positioning unit 28 that acquires an own vehicle position of the combine harvester 1 by using a satellite positioning system such as a GPS. The positioning unit 28 receives a positioning signal from a positioning satellite via a positioning antenna, and acquires position information of the positioning unit 28, that is, the own vehicle position of the combine harvester 1 on the basis of the positioning signal.

Next, a control device 30 of the combine harvester 1 will be described with reference to FIG. 2. The control device 30 is composed of a computer such as a CPU, and is connected to a communication part 32 that communicates with a memory part 31 such as a ROM, a RAM, a hard disk drive, and a flash memory, and an external device.

The memory part 31 stores a program and data for controlling various types of constituent components and various types of functions of the combine harvester 1, and the control device 30 executes an arithmetic process on the basis of the program and the data stored in the memory part 31, so that the various types of constituent components and the various types of functions are controlled. The control device 30 acquires the own vehicle position of the combine harvester 1 from the positioning unit 28, for example.

The communication part 32 is capable of wirelessly communicating with an external device such as a portable terminal 40 owned by the worker via a wireless communication antenna. The control device 30 controls the communication part 32 to perform wireless communication with the portable terminal 40, and transmits and receives various information to and from the portable terminal 40.

In addition, the control device 30 operates as an automatic traveling control part 35 and a discharge traveling control part 36 by executing the program stored in the memory part 31. The automatic traveling control part 35 and the discharge traveling control part 36 realize an automatic traveling step and a discharge traveling step of the automatic traveling method according to the present invention respectively.

The automatic traveling control part 35 controls the automatic traveling of the combine harvester 1 in a case where an automatic traveling mode is set. For example, the automatic traveling control part 35 acquires field information and an automatic traveling route 74 (see FIG. 3, etc.) set for the field from the portable terminal 40. When the automatic reaping traveling is started, the automatic traveling control part 35 acquires the own vehicle position of the combine harvester 1 from the positioning unit 28, and controls the power part 8, the traveling part 2, and the reaping part 3 such that the combine harvester 1 performs the automatic reaping traveling along the automatic traveling route 74 on the basis of the own vehicle position, the field information, and the automatic traveling route 74.

The discharge traveling control part 36 controls the discharge traveling in which the combine harvester 1 that has reached the transition position 75 (see FIG. 3, etc.) moves to the discharge position 76 (see FIG. 3, etc.). In a case where the manual traveling mode is set, when the combine harvester 1 that performs the automatic reaping traveling reaches the transition position 75, the discharge traveling control part 36 controls the power part 8 and the traveling part 2 such that the automatic traveling is interrupted and the operation of the reaping part 3 is stopped, and the automatic traveling is stopped at the transition position 75. In addition, the discharge traveling control part 36 controls the power part 8 and the traveling part 2 such that the discharge traveling is performed by manual traveling according to steering of the steering part 9 by a worker.

On the other hand, in a case where the automatic traveling mode is set, when the combine harvester 1 that performs the automatic reaping traveling reaches the transition position 75, the discharge traveling control part 36 controls the power part 8 and the traveling part 2 such that the operation of the reaping part 3 is stopped, but the automatic traveling is not stopped at the transition position 75, the discharge traveling is performed by automatic traveling along the discharge route from the transition position 75 to the discharge position 76. The discharge traveling control part 36 may control the combine harvester 1 to stop once at the transition position 75, and then to perform the discharge traveling towards the discharge position 76.

The portable terminal 40 is one of the constituent components of the combine harvester 1, is a terminal that can remotely operate the combine harvester 1, and is composed of, for example, a tablet terminal equipped with a touch panel, a laptop personal computer, or the like. An operation device similar to the portable terminal 40 may be provided in the steering part 9. In the present invention, the automatic traveling system is constituted by the combine harvester 1 and the portable terminal 40.

Figure 2:
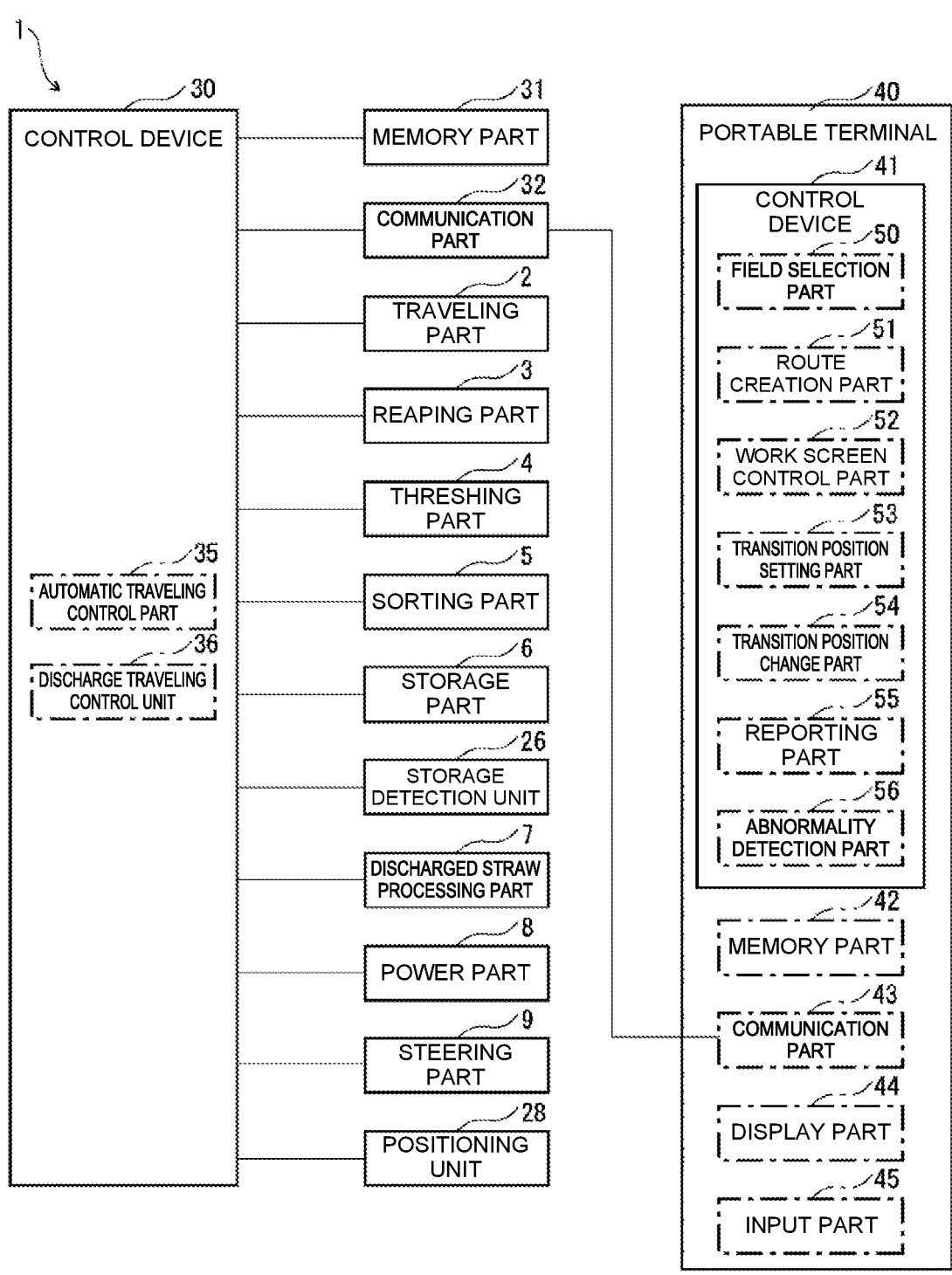
FIG. 2 is a block diagram of the combine harvester according to the embodiment of the present invention.

As illustrated in FIG. 2, the portable terminal 40 includes a control device 41 composed of a computer such as a CPU, and the control device 41 is connected to a memory part 42 such as a ROM, a RAM, a hard disk drive and a flash memory, and a communication part 43 that communicates with an external device. Further, the portable terminal 40 includes a display part 44, such as a touch panel and a monitor for displaying various information and outputting the various information to the worker, and an input part 45 such as a touch panel and an operation key for receiving an input operation of various information from the worker.

The memory part 42 stores a program and data for controlling various types of constituent components and various types of functions of the portable terminal 40, and the control device 41 executes an arithmetic process on the basis of the program and the data stored in the memory part 42, so that the various types of constituent components and the various types of functions of the portable terminal 40 are controlled. The memory part 42 stores field information of a field which is an object to be worked by the combine harvester 1. The field information includes, for example, shape, size and location information (coordinates, etc.) of the field area 70 (see FIG. 3, etc.) along the outer circumference of the field, the discharge position 76 adjacent to the collection part in the field and the like. In addition, the field information includes information such as the shape, size, and location information (coordinates, etc.) of the unreaped area 72 (see FIG. 3, etc.) that has not yet been worked on and the reaped area 73 (see FIG. 3, etc.) that has already been reaped.

In addition, the memory part 42 stores the maximum storage amount, which indicates the maximum amount of grain that the grain tank 24 of the storage part 6 can store, and the unit harvest amount, which is the amount that can be harvested per unit distance of the automatic reaping traveling.

The communication part 43 is communicatively connected to the communication part 32 of the combine harvester 1 via a wireless communication antenna. The control device 41 controls the communication part 43 to perform wireless communication with the combine harvester 1 and transmit and receive various information to and from the combine harvester 1.

The control device 41 of the portable terminal 40 operates as a field selection part 50, a route creation part 51, a work screen control part 52, a transition position setting part 53, a transition position change part 54, a reporting part 55, and an abnormality detection part 56 by executing the program stored in the memory part 42. Note that the field selection part 50, the route creation part 51, the work screen control part 52, the transition position setting part 53, the reporting part 55, and the abnormality detection part 56 realize a field selection step, a route creation step, a work screen control step, a transition position setting step, a reporting step, and an abnormality detection step of the automatic traveling method according to the present invention. The transition position change part 54 realizes a transition position changing step and a re-changing step of the automatic traveling method according to the present invention.

The field selection part 50 manually or automatically selects the field which is an object to be worked by the automatic traveling. For example, the field selection part 50 displays, on the display part 44, a field selection screen (not illustrated) for selectively displaying a field corresponding to the field information stored in the memory part 42. When any field is selected on the field selection screen in response to manual operation, the field selection part 50 selects the selected field as the object to be worked and reads the field information from the memory part 42.

The field selection part 50 selects a new field where the own vehicle position of the combine harvester 1 is positioned as a work target when a creation of a new field is operated on the field selection screen. The field selection part 50 creates field information of the new field by receiving, from the combine harvester 1, the own vehicle position of the combine harvester 1 positioned by the positioning unit 28 of the combine harvester 1 and recording the position information of the outer circumference or the position information of the route of the reaping traveling when the combine harvester 1 performs the reaping traveling while circling along the outer circumference of the new field. Then, the field selection part 50 stores the created field information in the memory part 42.

The route creation part 51 creates an automatic traveling route 74 (see FIG. 3, etc.) for the automatic reaping traveling in the field selected by the field selection part 50, stores the automatic traveling route 74 in the memory part 42, and sends the automatic traveling route 74 to the combine harvester 1 via the communication part 32. The automatic traveling route 74 includes traveling information related to automatic traveling and work information related to work such as automatic reaping. The traveling information includes the traveling position in the field as well as the traveling direction and the set vehicle speed at each traveling position. The work information includes information about the work such as reaping operation or stop, the reaping speed and the reaping height at each traveling position. The route creation part 51 creates a plurality of straight routes for reaping while traveling in the field in the forward direction according to a traveling pattern (reciprocating reaping or circumference reaping) selected by the operation of the portable terminal 40, and creates an automatic traveling route 74 by combining the plurality of straight routes and a plurality of turning routes that connect each of the straight routes.

In addition, the route creation part 51 creates a discharge route for performing the discharge traveling by automatic traveling from the transition position 75 set on the automatic traveling route 74 to the discharge position 76, stores the discharge route in the memory part 42, and sends the discharge route to the combine harvester 1 via the communication part 32. The discharge route includes traveling information about automatic traveling, and the traveling information includes the traveling position in the field as well as the direction of travel and set vehicle speed at each traveling position. The route creation part 51 creates the discharge route by, for example, combining a straight route and a turning route in such a manner that the discharge route avoids the unreaped area 72 and moves from the transition position 75 to the discharge position 76.

When a field is selected by the field selection part 50 and an automatic traveling route 74 is created by the route creation part 51, the work screen control part 52 displays, on the display part 44, a work screen 60 for performing automatic traveling according to the automatic traveling route 74, as illustrated in FIG. 3. On the work screen 60, the work screen control part 52 at least displays a map field 61, and displays a work start button 62, a discharge setting button 63, a discharge advance button 64 (discharge transition operation part), and a discharge postpone button 65 (discharge transition operation part) in an operable manner. In addition, on the work screen 60, the work screen control part 52 displays a field registration name 66 that is based on the field information, and an allowable reaping distance 67 that is based on the vacant capacity of the grain tank 24 in which the combine harvester 1 stores grains.

The work screen control part 52 displays, in the map field 61, a field area 70 along the outer circumference of the field on the map on the basis of the field information of the field selected by the field selection part 50. In addition, the work screen control part 52 displays, in the map field 61, an own vehicle marker 71 of the combine harvester 1 at the own vehicle position of the combine harvester 1 positioned by the positioning unit 28 of the combine harvester 1. The work screen control part 52 identifiably displays the unreaped area 72 and the reaped area 73 in the field area 70. The work screen control part 52 updates the position of the own vehicle marker 71 and the ranges of the unreaped area 72 and the reaped area 73 according to the progress of the automatic reaping traveling of the combine harvester 1.

The work screen control part 52 displays, in the map field 61, the automatic traveling route 74 created by the route creation part 51 on the field area 70 in a superposed manner. The work screen control part 52 identifiably displays the interruption position at which the combine harvester 1 interrupts the automatic reaping traveling in order to discharge stored grain, that is, the transition position 75, and the discharge position 76 at which the combine harvester 1 discharges the stored grains on the field area 70 in a superposed manner. In addition, the work screen control part 52 may display a discharge route on the field area 70 in a superposed manner in a case where the discharge route has been set. In this embodiment, a transition position 75 set by the transition position setting part 53 is referred to as a first transition position 75a, and a transition position 75 changed by the transition position change part 54 is referred to as a second transition position 75b.

The work screen control part 52 makes the work start button 62 selectable in a case where a start condition for the automatic reaping traveling is met, while makes the work start button 62 unselectable in a case where the start condition is not met. When the work start button 62 is selected, the work screen control part 52 sends information about the field and the automatic traveling route 74 as well as a start instruction to combine harvester 1. The combine harvester 1, in response to the start instruction, performs the automatic reaping traveling along the automatic traveling route 74, while sending the own vehicle position of the combine harvester 1 positioned by the positioning unit 28 of the combine harvester 1 to the portable terminal 40.

While the combine harvester 1 is performing the automatic reaping traveling, the work screen control part 52 selectably displays a work stop button (not illustrated) instead of the work start button 62. When the work stop button is selected, the work screen control part 52 sends a stop instruction to the combine harvester 1. The combine harvester 1 ends the automatic reaping traveling in response to the stop instruction. In addition, when the combine harvester 1 ends the automatic reaping traveling, the work screen control part 52 displays the work start button 62 instead of the work stop button.

When the discharge setting button 63 is selected on the work screen 60, the work screen control part 52 displays, on the display part 44, a discharge position setting screen (not illustrated) for setting the discharge position 76. On the discharge position setting screen, not only the discharge position 76 can be set, but also the discharge traveling to the discharge position 76 can be set to be performed automatically or manually.

When the discharge advance button 64 is selected on the work screen 60, and then when the transition position 75 is changed to be advanced by the transition position change part 54 as described below, the work screen control part 52 updates the display to the second transition position 75b, which has been changed.

When the discharge postpone button 65 is selected on the work screen 60, and then when the transition position 75 is changed to be postponed by the transition position change part 54 as described below, the work screen control part 52 updates the display to the second transition position 75b, which has been changed.

Figure 4:
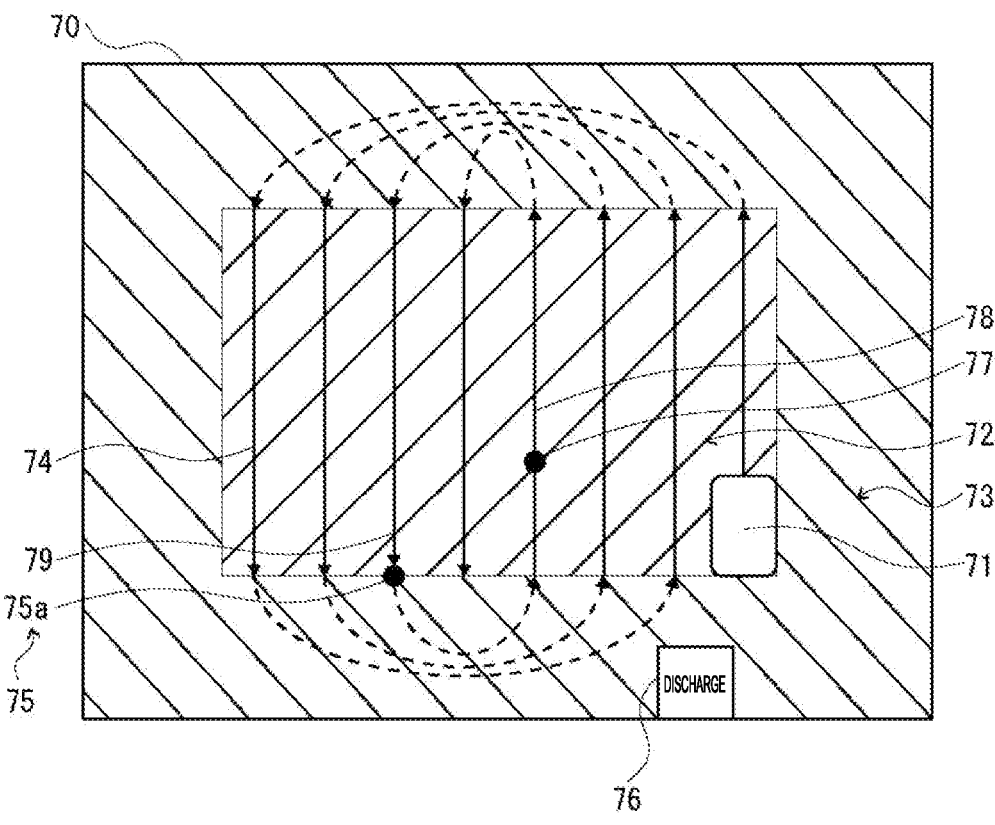
FIG. 4 is a plan view illustrating an example of a field in which a transition position based on a storage amount is set in the combine harvester according to the embodiment of the present invention.

The transition position setting part 53 determines the timing at which the combine harvester 1 transitions from the automatic reaping traveling to the discharge traveling on the basis of the storage amount of harvested grain, and sets the transition position 75 on the automatic traveling route 74 as illustrated in FIG. 4.

For example, the transition position setting part 53 detects the storage amount of grain stored in the grain tank 24 (current storage amount) on the basis of the detection result of the storage detection part 26 of the storage part 6, and calculates the vacant capacity of the grain tank 24 to store grain on the basis of the maximum storage amount of the grain tank 24 and the current storage amount. The transition position setting part 53 divides the vacant capacity of the grain tank 24 by the unit harvest amount of the combine harvester 1 to calculate the allowable reaping distance 67. The transition position setting part 53 calculates, on the basis of the automatic traveling route 74, the own vehicle position of the combine harvester 1, and the allowable reaping distance 67, the position where the allowable reaping distance 67 passes on the automatic traveling route 74, that is, a full amount position 77 where the grain tank 24 becomes full, and defines the straight route having the full amount position 77 as a full amount route 78.

Then, the transition position setting part 53 sets a predetermined straight route that is reached before the full amount route 78 in the automatic traveling route 74 as an interruption route 79, and sets the interruption position, that is, the transition position 75 at the end of this interruption route 79. The transition position setting part 53 preferably sets the route that is reached just before the full amount route 78 among the straight routes, which extend forward perpendicularly to the direction of the extension of a headland where the discharge position 76 is set and head towards the headland, to be the interruption route 79, and sets the transition position 75 at the end of the interruption route 79 (end part on the discharge position 76 side). In this embodiment, the transition position 75 that is set on the basis of the storage amount of harvested grain is referred to as the first transition position 75a.

Figure 5:
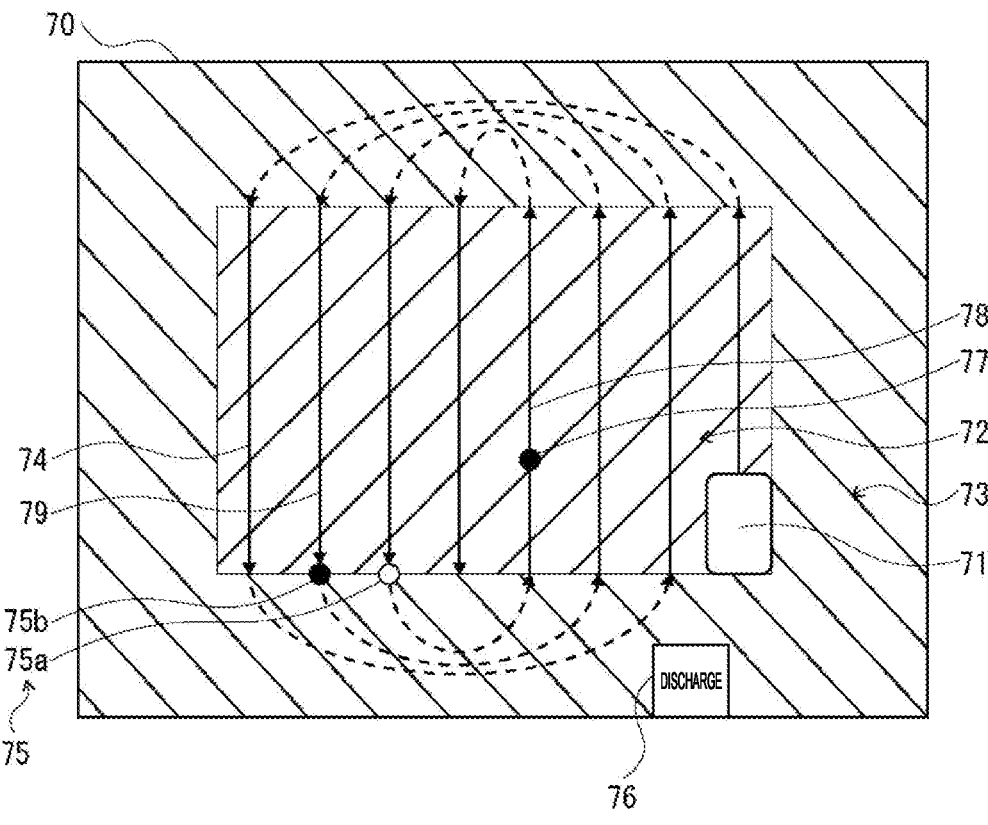
FIG. 5 is a plan view illustrating an example of the field in which the transition position is changed to be advanced in the combine harvester according to the embodiment of the present invention.
Figure 6:
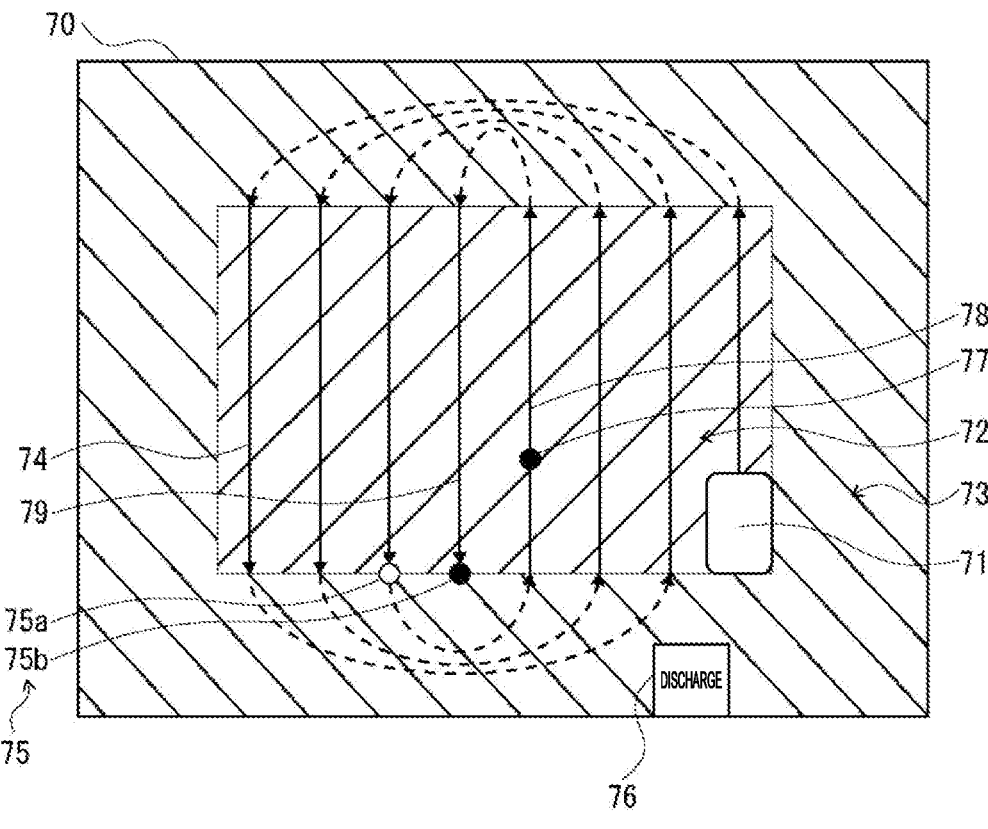
FIG. 6 is a plan view illustrating an example of the field in which the transition position is changed to be postponed in the combine harvester according to the embodiment of the present invention.

As illustrated in FIGS. 5 and 6, the transition position change part 54 changes, as the transition position 75, the first transition position 75a which is set on the basis of the storage amount of grain by the transition position setting part 53, to a new second transition position 75b in response to the operation of the discharge transition operation part such as the discharge advance button 64 or the discharge postpone button 65.

When the discharge advance button 64 is selected, as illustrated in FIG. 5, the transition position change part 54 resets a predetermined straight route, which is reached before the straight route at which the first transition position 75a has been set, as an interruption route 79, and changes the transition position 75 so as to set the interruption position, that is, the second transition position 75b at the end of this interruption route 79. The transition position change part 54 preferably resets the straight route on which the own vehicle position of the combine harvester 1 is positioned or the route that is reached immediately thereafter among the straight routes, which extend forward perpendicularly to the direction of the extension of a headland where the discharge position 76 is set and head towards the headland, to be the interruption route 79, and sets the second transition position 75b at the end of the interruption route 79 (end part on the discharge position 76 side).

In addition, in a case where the second transition position 75b is set before the first transition position 75a, and then the discharge advance button 64 is selected again, the transition position change part 54 changes the transition position 75 so as to cancel the setting of the second transition position 75b and reset the first transition position 75a.

In a case where the discharge advance button 64 is operated continuously, for example, in a case where the discharge advance button 64 is continuously pressed within a predetermined time interval, the transition position change part 54 shifts the setting candidate, from the straight route at which the first transition position 75a has been set to the straight route on which the own vehicle position of the combine harvester 1 is positioned, by one each time the discharge advance button 64 is operated, and sets the second transition position 75b at the end of the straight route of the setting candidate to be shifted when the continuous operation of the discharge advance button 64 is completed. In this case, the work screen control part 52 may identifiably display the end of the straight route of the setting candidate each time the discharge advance button 64 is operated. When the discharge advance button 64 is pressed with a predetermined time interval, the normal operation described above is performed, which is different from the case of continuous operation.

As illustrated in FIG. 6, when the discharge postpone button 65 is selected, the transition position change part 54 resets, as an interruption route 79, a predetermined straight route that is reached after the straight route at which the first transition position 75a has been set, and the transition position change part 54 changes the transition position 75 in such a manner that the interruption position, that is, the second transition position 75b is set at the end of the interruption route 79. The transition position change part 54 preferably resets the straight route that is reached immediately after the straight route at which the first transition position 75a has been set among the straight routes, which extend forward perpendicularly to the direction of the extension of a headland where the discharge position 76 is set and head towards the headland, to be the interruption route 79, and sets the second transition position 75b at the end of the interruption route 79 (end part on the discharge position 76 side).

In addition, in a case where the second transition position 75b is set after the first transition position 75a, and then the discharge postpone button 65 is selected again, the transition position change part 54 changes the transition position 75 so as to cancel the setting of the second transition position 75b and reset the first transition position 75a.

In a case where the discharge postpone button 65 is operated continuously, for example, in a case where the discharge postpone button 65 is continuously pressed within a predetermined time interval, the transition position change part 54 shifts the setting candidate, from the straight route at which the first transition position 75a has been set to a subsequent straight route after a predetermined number of straight routes, by one each time the discharge postpone button 65 is operated, and sets the second transition position 75b at the end of the straight route of the setting candidate to be shifted when the continuous operation of the discharge postpone button 65 is completed. In this case, the work screen control part 52 may identifiably display the end of the straight route of the setting candidate each time the discharge postpone button 65 is operated. When the discharge postpone button 65 is pressed with a predetermined time interval, the normal operation described above is performed, which is different from the case of continuous operation.

The reporting part 55 reports the change in the transition position 75 when the transition position 75 is changed by the transition position change part 54 in response to the operation of the discharge transition operation part such as the discharge advance button 64 or the discharge postpone button 65. For example, the reporting part 55 may report the change in the transition position 75 by displaying a message or lamp indicating the change in the transition position 75 on the display part 44. The reporting part 55 may also report the change in the transition position 75 by flashing the transition position 75 on the work screen 60 or updating the display of the transition position 75 on the work screen 60. Furthermore, the reporting part 55 may report the change in the transition position 75 by audio output, buzzer, or other means.

The abnormality detection part 56 detects an abnormality in the storage detection part 26 of the storage part 6, which detects the storage amount of grain in the grain tank 24 of the storage part 6. For example, the abnormality detection part 56 inputs the detection results of the storage detection part 26 and detects an abnormality in the storage detection part 26 when the storage amount in the grain tank 24 differs significantly from the expected amount or when the unit increment amount of grain harvested in the automatic reaping traveling differs significantly from the expected amount. Alternatively, the abnormality detection part 56 may monitor the current value that is output by the storage detection part 26, and may detect an abnormality in the storage detection part 26 when an abnormal value is detected.

When the abnormality detection part 56 detects an abnormality in the storage detection part 26, and in a case where the first transition position 75a is set by the transition position setting part 53 and displayed in the map field 61 of the work screen 60, the first transition position 75a set on the basis of the storage amount is not reliable, so the abnormality detection part 56 prompts and reports to change the transition position 75 by the operation of the discharge transition operation part such as the discharge advance button 64 or the discharge postpone button 65. For example, the abnormality detection part 56 may prompt a change in the transition position 75 by displaying a message or lamp on the display part 44 to prompt the change in the transition position 75. Furthermore, the abnormality detection part 56 may prompt a change in the transition position 75 by audio output, buzzer, or other means.

Figure 7:
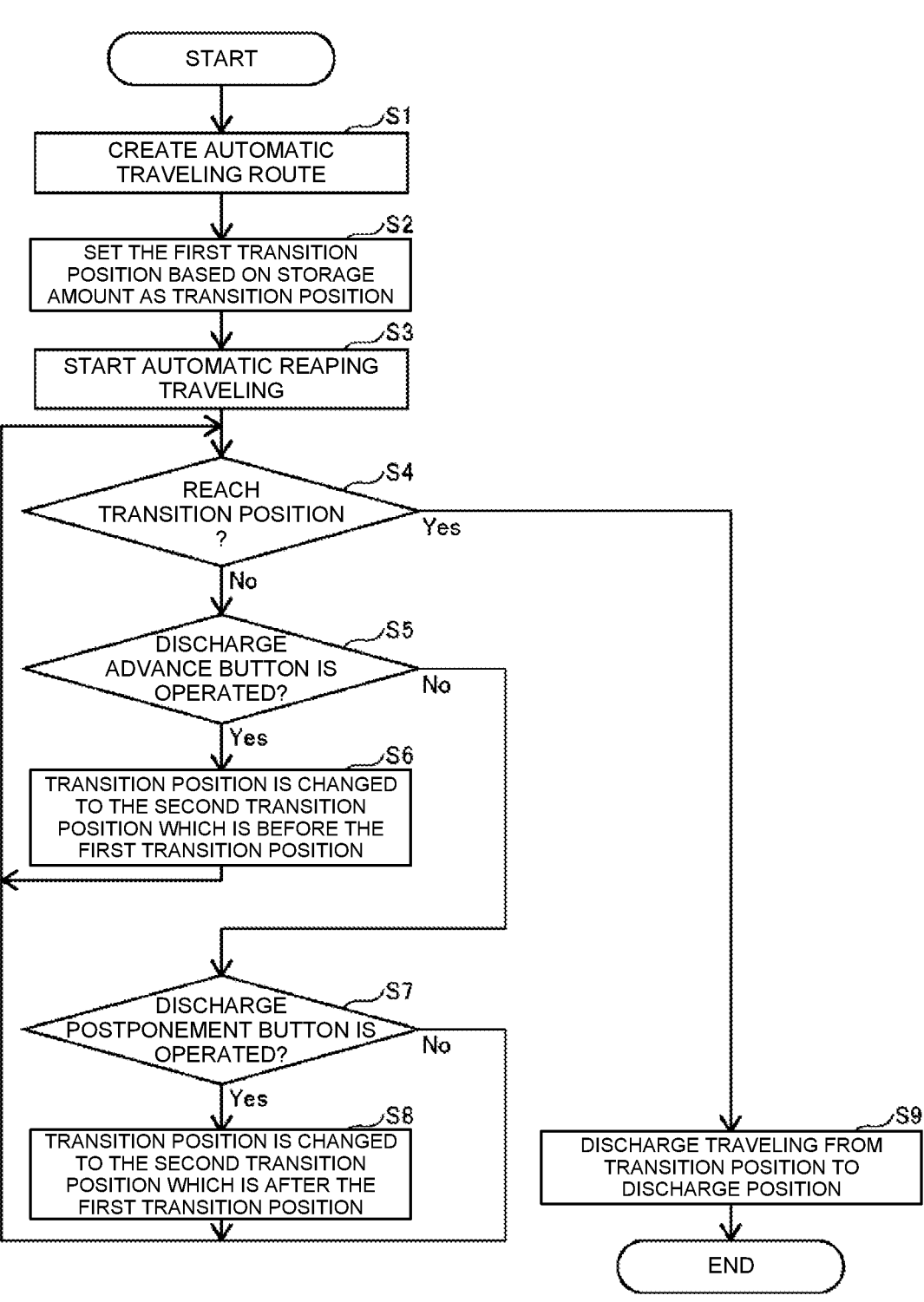
FIG. 7 is a flowchart illustrating an example of an operation of setting the transition position in the combine harvester according to the embodiment of the present invention.

Now, an example of operation for setting the transition position 75 in the combine harvester 1 will be described with reference to a flowchart in FIG. 7.

First, at the portable terminal 40 of the combine harvester 1, for the field selected by the field selection part 50, the route creation part 51 creates the automatic traveling route 74 (step S1). The transition position setting part 53 calculates the full amount position 77 on the basis of the automatic traveling route 74, the own vehicle position of the combine harvester 1, and the allowable reaping distance 67, and then sets, on the basis of the full amount position 77, the first transition position 75a based on the storage amount as the transition position 75 (step S2).

After the combine harvester 1 starts the automatic reaping traveling along the automatic traveling route 74 (step S3), before the combine harvester 1 reaches the transition position 75 (step S4: No), and when the discharge advance button 64 is operated (step S5: Yes), the transition position 75 is changed, by the transition position change part 54, to the second transition position 75b, which is before the first transition position 75a (step S6).

Alternatively, before the combine harvester 1 reaches the transition position 75 (step S4: No), and when the discharge postpone button 65 is operated (step S7: Yes), the transition position 75 is changed, by the transition position change part 54, to the second transition position 75b, which is after the first transition position 75a (step S8).

In addition, when the combine harvester 1 reaches the transition position 75 (step S4: Yes), the automatic reaping traveling is interrupted and the discharge traveling is performed by the discharge traveling control part 36 from the transition position 75 to the discharge position 76 by manual traveling or automatic traveling (step S9).

As described above, according to this embodiment, the combine harvester 1 includes the control device 30 and the portable terminal 40. The control device 30 functions as the automatic traveling control part 35 for controlling the work vehicle to perform automatic traveling on the basis of an automatic traveling route comprising a plurality of set straight traveling routes and a plurality of set turning routes, and as the discharge traveling control part 36 for controlling the work vehicle to perform discharge traveling from a predetermined transition position on the automatic traveling route to a discharge position. The portable terminal 40 includes the control device 41, and the control device 41 functions as the transition position change part 54 for changing, as the transition position, the first transition position that is set on the basis of the storage amount of harvested grain, to the new second transition position in response to the operation of the discharge transition operation part such as the discharge advance button 64 and the discharge postpone button 65.

In other words, in the present invention, an automatic traveling method for causing a work vehicle such as a combine harvester 1 to perform automatic traveling in a field comprises: an automatic traveling step for performing automatic traveling on the basis of an automatic traveling route comprising a plurality of set straight traveling routes and a plurality of set turning routes; a discharge traveling step for performing discharge traveling from a predetermined transition position on the automatic traveling route to a discharge position; and a transition position changing step for changing, as the transition position, a first transition position that is set on the basis of a storage amount of harvested grain, to a new second transition position in response to an operation of a discharge transition operation part.

As a result, even when the first transition position has been set in advance on the basis of the storage amount of harvested grain, the combine harvester 1 can transition from automatic traveling to discharge traveling at a timing that matches the worker's intention by changing the first transition position to the new second transition position in response to the operation of the discharge transition control part such as the discharge advance button 64 or the discharge postpone button 65. Therefore, the discharging timing can be determined according to the working hours and the convenience of the collection part, and even when the allowable reaping distance 67 cannot be calculated accurately due to a failure of the storage detection part 26 or incomplete discharge, the worker can determine the discharge timing. Furthermore, even when the harvest amount varies from field to field, the worker can set the transition position to a position closer to the timing when the grain tank 24 becomes full, on the basis of a rule of thumb. In a case where the automatic reaping traveling can be performed up to the second transition position without the grain tank 24 becoming full beyond the first transition position based on the storage amount, a correction value for calculating the allowable reaping distance 67 can be calculated on the basis of the distance traveled in this case. Thereby, the allowable reaping distance 67 can be calculated more accurately in subsequent automatic reaping traveling. Thus, the discharge traveling can be performed smoothly without interfering with smooth automatic traveling.

According to this embodiment, the transition position change part 54 functions as a re-changing step in which, after changing the transition position to the second transition position in response to the operation of the discharge transition operation part such as the discharge advance button 64 and the discharge postpone button 65, the transition position change part 54 re-change the second transition position to the first transition position in response to a predetermined operation.

Consequently, even when the discharge transition operation part is mistakenly operated and the transition position is changed, the transition position can be re-changed to the first transition position based on the storage amount of grain by operating the discharge transition operation part again, thereby improving the operability leading to the discharge traveling.

According to this embodiment, the control device 41 of the portable terminal 40 functions as the reporting part 55, which reports that the transition position has been changed when the transition position is changed in response to the operation of the discharge transition operation part.

This allows the worker to recognize that the transition position has been changed in response to the operation of the discharge transition operation part and to grasp the discharge timing.

According to this embodiment, the transition position change part 54, when the discharge transition operation part is operated, sets the second transition position at any ends of the straight routes that are reached before the first transition position among the straight routes, which extend forward perpendicularly to the direction of the extension of a headland where the discharge position is set and head towards the headland.

This allows the worker to set the second transition position in accordance with the worker's intention and transition to the discharge traveling, even when the worker desires to discharge the harvested grain at a position before reaching the first transition position based on the storage amount. In addition, the transition position is set at a position closer to the discharge position, which makes it easier to set the route for performing the discharge traveling from the transition position to the discharge position.

According to this embodiment, when the discharge transition operation part is operated, the transition position change part 54 sets the second transition position at any ends of the straight routes that are reached after the first transition position among the straight routes, which extend forward perpendicularly to the direction of the extension of a headland where the discharge position is set and head towards the headland.

This allows the worker to set the second transition position in accordance with the worker's intention and transition to the discharge traveling, even when the worker wants to discharge the harvested grain at a position after passing through the first transition position based on the storage amount. In addition, the transition position is set at a position closer to the discharge position, which makes it easier to set the route for performing the discharge traveling from the transition position to the discharge position.

According to this embodiment, the control device 41 of the portable terminal 40 functions as the abnormality detection part 56 that detects an abnormality of the storage detection part 26 (sensor) that detects the storage amount, and when the abnormality of the storage detection part 26 is detected by the abnormality detection part 56, the control device 41 of the portable terminal 40 reports to change the transition position 75 by the discharge transition operation part.

As a result, the worker can recognize the abnormality of the storage detection part 26, as well as the abnormality of the calculation of the allowable reaping distance 67 and the abnormality of the setting of the transition position. The worker can also grasp that the transition position should be changed by the discharge transition operation part. Thus, even when the storage detection part 26 is out of order, the transition position can be set and the transition to the discharge traveling can be made.

In the embodiment described above, examples in which the transition position change part 54, when the discharge transition operation part is operated, sets the second transition position at any ends of the straight routes that are reached before the first transition position or at any ends of the straight routes that are reached after the first transition position among the straight routes, which extend forward perpendicularly to the direction of the extension of a headland where the discharge position is set and head towards the headland are described, but the present invention is not limited to these examples.

In other examples, when the discharge advance button 64 is operated, the transition position change part 54 sets the second transition position at the end of the straight route on which the combine harvester 1 is proceeding in the automatic reaping traveling to replace the first transition position. In a case where the combine harvester 1 is traveling on a turning route of the automatic traveling route when the discharge advance button 64 is operated, the transition position change part 54 may set the second transition position at the end of the straight route that follows the turning route. In this case, it is assumed that the first transition position is not set at the end of the next straight route of the straight route or turning route on which the combine harvester 1 is proceeding.

As a result, in a case where the worker desires to discharge the harvested grain immediately, the transition position is set at the end of the most recent straight route in accordance with the worker's intention, so that the transition to discharge traveling can be made earlier, and the route for performing discharge traveling from the transition position to the discharge position can be set easily.

In the embodiment described above, an example in which the combine harvester 1 has the discharge transition operation part such as the discharge advance button 64 and the discharge postpone button 65 on the work screen 60 displayed on the display part 44 of the portable terminal 40, but the present invention is not limited to this example. In other examples, the discharge transition operation part such as the discharge advance button 64 and the discharge postpone button 65 may be provided on the steering part 9 of the combine harvester 1.

In the above embodiments, the example of the combine harvester 1 composed of the head-feeding type combine harvester is described. However, the present invention is not limited to this example, and the combine harvester 1 may be composed of an ordinary-type combine harvester.

In the above embodiments, an example in which the work vehicle is composed of the combine harvester 1 is described, but the present invention is not limited to this example. For example, the work vehicle of the present invention may be composed of other agricultural work machine for harvesting crops, or may be composed of a work vehicle other than the agricultural work machine.

The present invention can be modified as appropriate to the extent that it does not contradict the gist or idea of the invention that can be read from the claims and the specification as a whole, and the automatic traveling method, the work vehicle and the automatic traveling method with such modifications are also included in the technical concept of the present invention.

REFERENCE SIGNS LIST

1: Combine harvester (work vehicle)
2: Traveling part
3: Reaping part
6: Storage part
24: Grain tank
26: Storage detection part (sensor)
30: Control device
35: Automatic traveling control part
36: Discharge traveling control part
40: Portable terminal
41: Control device
44: Display part
53: Transition position setting section
54: Transition position change part
55: Reporting part
56: Abnormality detection part
60: Work screen
64: Discharge advance button (discharge transition operation part)

65: Discharge postpone button (discharge transition operation part)

The invention claimed is:

1. An automatic traveling method for causing a work vehicle to perform automatic traveling in a field, the method comprising:

an automatic traveling step for performing automatic traveling on the basis of an automatic traveling route comprising a plurality of set straight traveling routes and a plurality of set turning routes;

a discharge traveling step for performing discharge traveling from a predetermined transition position on the automatic traveling route to a discharge position; and a transition position changing step for changing, as the predetermined transition position, a first transition position that is set before the start of the automatic traveling and on the basis of a storage amount of grain, to a new second transition position in response to an operation of a discharge transition operation part.

2. The automatic traveling method according to claim 1, further comprising:

a re-changing step for re-changing the second transition position to the first transition position in response to a predetermined operation after changing the transition position to the second transition position in response to the operation of the discharge transition operation part.

3. The automatic traveling method according to claim 1, further comprising:

a reporting step for reporting that the transition position has been changed when the transition position is changed in response to the operation of the discharge transition operation part.

4. The automatic traveling method according to claim 1, wherein:

in the transition position changing step, when the discharge transition operation part is operated, the second transition position is set at any ends of the straight routes that are reached before the first transition position among the straight routes, which extend forward perpendicularly to the direction of the extension of a headland where the discharge position is set and head towards the headland.

5. The automatic traveling method according to claim 1, wherein:

in the transition position changing step, when the discharge transition operation part is operated, the second transition position is set at any ends of the straight routes that are reached after the first transition position among the straight routes, which extend forward perpendicularly to the direction of the extension of a headland where the discharge position is set and head towards the headland.

6. The automatic traveling method according to claim 1, wherein:

in the transition position changing step, when the discharge transition operation part is operated, the second transition position is set at the end of the straight route on which the work vehicle is proceeding.

7. The automatic traveling method according to claim 1, further comprising:

an abnormality detection step for detecting an abnormality of a sensor that detects the storage amount, and when the abnormality of the sensor is detected by the abnormality detection step, a report is made to change the transition position by the discharge transition operation part.

8. A work vehicle that performs automatic traveling in a field, the work vehicle comprising:

an automatic traveling control part for controlling the work vehicle to perform automatic traveling on the basis of an automatic traveling route comprising a plurality of set straight traveling routes and a plurality of set turning routes;

a discharge traveling control part for controlling the work vehicle to perform discharge traveling from a predetermined transition position on the automatic traveling route to a discharge position; and a transition position change part for changing, as the predetermined transition position, a first transition position that is set before the start of the automatic traveling and on the basis of a storage amount of grain, to a new second transition position in response to an operation of a discharge transition operation part.

9. An automatic traveling system for causing a work vehicle to perform automatic traveling in a field, the system comprising:

an automatic traveling control part for controlling the work vehicle to perform automatic traveling on the basis of an automatic traveling route comprising a plurality of set straight traveling routes and a plurality of set turning routes;

a discharge traveling control part for controlling the work vehicle to perform discharge traveling from a predetermined transition position on the automatic traveling route to a discharge position; and a transition position change part for changing, as the predetermined transition position, a first transition position that is set before the start of the automatic traveling and on the basis of a storage amount of grain, to a new second transition position in response to an operation of a discharge transition operation part.

* * * * *